(12) United States Patent
Kobylevsky et al.

(10) Patent No.: US 8,811,578 B2
(45) Date of Patent: Aug. 19, 2014

(54) SYSTEM AND METHOD FOR PROVIDING LOCAL INTERACTIVE VOICE RESPONSE SERVICES

(75) Inventors: Paul Kobylevsky, Cliffside Park, NJ (US); Valery Gurovich, Ramsey, NJ (US)

(73) Assignee: Telemanager Technologies, Inc., Newark, NJ (US)

( * ) Notice: Subject to any disclaimer, the term of this patent is extended or adjusted under 35 U.S.C. 154(b) by 467 days.

(21) Appl. No.: 12/409,173

(22) Filed: Mar. 23, 2009

(65) Prior Publication Data

US 2010/0239075 A1 Sep. 23, 2010

(51) Int. Cl.
H04M 11/00 (2006.01)

(52) U.S. Cl.
USPC ...................................... 379/93.12; 379/88.18

(58) Field of Classification Search
USPC ....................... 379/93.12, 88.18, 88.17, 88.25
See application file for complete search history.

(56) References Cited

U.S. PATENT DOCUMENTS

| 4,436,962 | A | | 3/1984 | Davis et al. |
|---|---|---|---|---|
| 4,766,542 | A | | 8/1988 | Pilarczyk |
| 4,958,280 | A | | 9/1990 | Pauly et al. |
| 4,975,841 | A | | 12/1990 | Kehnemuyi et al. |
| 5,208,762 | A | | 5/1993 | Charhut et al. |
| 5,249,221 | A | | 9/1993 | Ketring |
| 5,327,341 | A | | 7/1994 | Whalen et al. |
| 5,345,501 | A | * | 9/1994 | Shelton ........................ 379/88.2 |
| 5,428,670 | A | | 6/1995 | Gregorek et al. |
| 5,444,767 | A | | 8/1995 | Goetcheus et al. |
| 5,450,488 | A | | 9/1995 | Pugaczewski et al. |
| 5,475,742 | A | | 12/1995 | Gilbert |
| 5,509,064 | A | | 4/1996 | Welner et al. |
| 5,511,594 | A | | 4/1996 | Brennan et al. |
| 5,546,452 | A | | 8/1996 | Andrews et al. |
| 5,597,995 | A | | 1/1997 | Williams et al. |
| 5,612,869 | A | | 3/1997 | Letzt et al. |
| 5,636,209 | A | | 6/1997 | Perlman |
| 5,646,912 | A | | 7/1997 | Cousin |
| 5,666,492 | A | | 9/1997 | Rhodes et al. |
| 5,737,396 | A | | 4/1998 | Garcia |
| 5,737,539 | A | | 4/1998 | Edelson et al. |
| 5,772,585 | A | | 6/1998 | Lavin et al. |

(Continued)

FOREIGN PATENT DOCUMENTS

| WO | WO 01/91105 A2 | 11/2001 |
|---|---|---|
| WO | WO 03/069597 A1 | 8/2003 |
| WO | WO 2006/031983 A2 | 3/2006 |

OTHER PUBLICATIONS

Office Action dated Sep. 29, 2009, from pending U.S. Appl. No. 10/641,307 (10 pages).

(Continued)

Primary Examiner — Olisa Anwah
(74) Attorney, Agent, or Firm — McCarter & English, LLP

(57) ABSTRACT

A system and method for providing local interactive voice response (IVR) services is provided. A local computer system having associated telephony equipment and installed at a local facility (e.g., a retail store of a chain, etc.) receives telephone calls to the local facility. The local computer system generates IVR prompts locally, and is controlled by a central IVR server. Reduced bandwidth is required between the local computer system and the central IVR server since no voice traffic is communicated between the central IVR server and the local computer system.

21 Claims, 4 Drawing Sheets

(56) References Cited

U.S. PATENT DOCUMENTS

| | | | |
|---|---|---|---|
| 5,825,856 A | 10/1998 | Porter et al. | |
| 5,845,255 A | 12/1998 | Mayaud | |
| 5,884,262 A * | 3/1999 | Wise et al. | 704/270.1 |
| 5,907,493 A | 5/1999 | Boyer et al. | |
| 5,909,670 A | 6/1999 | Trader et al. | |
| 5,915,001 A * | 6/1999 | Uppaluru | 379/88.22 |
| 5,926,526 A | 7/1999 | Rapaport et al. | |
| 5,950,630 A | 9/1999 | Portwood et al. | |
| 5,950,632 A | 9/1999 | Reber et al. | |
| 5,970,124 A | 10/1999 | Csaszar et al. | |
| 5,970,462 A | 10/1999 | Reichert | |
| 5,971,594 A | 10/1999 | Sahai et al. | |
| 5,982,863 A | 11/1999 | Smiley et al. | |
| 5,996,006 A | 11/1999 | Speicher | |
| 6,014,631 A | 1/2000 | Teagarden et al. | |
| 6,018,713 A | 1/2000 | Coli et al. | |
| 6,055,513 A | 4/2000 | Katz et al. | |
| 6,061,347 A | 5/2000 | Hollatz et al. | |
| 6,088,429 A * | 7/2000 | Garcia | 379/88.22 |
| 6,108,634 A | 8/2000 | Podnar et al. | |
| 6,112,182 A | 8/2000 | Akers et al. | |
| 6,161,095 A | 12/2000 | Brown | |
| 6,192,112 B1 | 2/2001 | Rapaport et al. | |
| 6,202,923 B1 | 3/2001 | Boyer et al. | |
| 6,240,394 B1 | 5/2001 | Uecker et al. | |
| 6,269,336 B1 * | 7/2001 | Ladd et al. | 704/270 |
| 6,298,330 B1 | 10/2001 | Gardenswartz et al. | |
| 6,314,402 B1 | 11/2001 | Monaco et al. | |
| 6,421,427 B1 | 7/2002 | Hill et al. | |
| 6,456,699 B1 | 9/2002 | Burg et al. | |
| 6,493,427 B1 | 12/2002 | Kobylevsky et al. | |
| 6,578,003 B1 | 6/2003 | Camarda et al. | |
| 6,680,999 B1 | 1/2004 | Garcia | |
| 6,687,676 B1 | 2/2004 | Denny | |
| 6,718,017 B1 | 4/2004 | Price et al. | |
| 6,744,862 B2 | 6/2004 | Kobylevsky et al. | |
| 6,754,636 B1 | 6/2004 | Walker et al. | |
| 6,768,788 B1 | 7/2004 | Langseth et al. | |
| 6,778,647 B1 * | 8/2004 | Dumas | 379/93.12 |
| 6,804,333 B1 * | 10/2004 | Liu et al. | 379/88.17 |
| 6,804,654 B2 | 10/2004 | Kobylevsky et al. | |
| 6,850,603 B1 | 2/2005 | Eberle et al. | |
| 6,973,435 B1 | 12/2005 | Sioufi et al. | |
| 6,999,930 B1 * | 2/2006 | Roberts et al. | 704/270.1 |
| 7,058,584 B2 | 6/2006 | Kosinski et al. | |
| 7,149,287 B1 * | 12/2006 | Burger et al. | 379/88.17 |
| 7,174,006 B2 * | 2/2007 | Guedalia et al. | 379/88.13 |
| 7,267,278 B2 | 9/2007 | Lammle | |
| 7,349,947 B1 | 3/2008 | Slage et al. | |
| 7,469,213 B1 | 12/2008 | Rao | |
| 7,558,380 B2 | 7/2009 | DiVenuta et al. | |
| 7,620,161 B2 * | 11/2009 | Liu et al. | 379/88.25 |
| 7,769,601 B1 | 8/2010 | Bleser et al. | |
| 7,848,934 B2 | 12/2010 | Kobylevsky et al. | |
| 8,150,706 B2 | 4/2012 | Kobylevsky et al. | |
| 2001/0012335 A1 | 8/2001 | Kaufman et al. | |
| 2002/0007285 A1 | 1/2002 | Rappaport | |
| 2002/0010584 A1 | 1/2002 | Schultz et al. | |
| 2002/0023230 A1 | 2/2002 | Bolnick et al. | |
| 2002/0048349 A1 | 4/2002 | Bixler et al. | |
| 2002/0052760 A1 | 5/2002 | Munoz et al. | |
| 2002/0052762 A1 | 5/2002 | Kobylevsky et al. | |
| 2002/0091566 A1 | 7/2002 | Siegel | |
| 2002/0095261 A1 | 7/2002 | Gut et al. | |
| 2002/0143579 A1 | 10/2002 | Docherty et al. | |
| 2002/0164004 A1 | 11/2002 | Tamura et al. | |
| 2003/0018495 A1 | 1/2003 | Sussman | |
| 2003/0050799 A1 | 3/2003 | Jay et al. | |
| 2003/0093295 A1 | 5/2003 | Lilly et al. | |
| 2003/0120513 A1 | 6/2003 | Samaquial | |
| 2003/0154106 A1 | 8/2003 | Marks | |
| 2003/0212558 A1 * | 11/2003 | Matula | 704/260 |
| 2003/0216831 A1 | 11/2003 | Hart et al. | |
| 2003/0225595 A1 | 12/2003 | Helmus et al. | |
| 2003/0236729 A1 | 12/2003 | Epstein et al. | |
| 2004/0019502 A1 | 1/2004 | Leaman et al. | |
| 2004/0019567 A1 | 1/2004 | Herceg et al. | |
| 2004/0037401 A1 * | 2/2004 | Dow et al. | 379/88.18 |
| 2004/0071275 A1 * | 4/2004 | Bowater et al. | 379/88.18 |
| 2004/0107117 A1 | 6/2004 | Denny | |
| 2004/0122712 A1 | 6/2004 | Hill, Sr. et al. | |
| 2004/0172295 A1 | 9/2004 | Dahlin et al. | |
| 2004/0228457 A1 | 11/2004 | Espejo et al. | |
| 2005/0060200 A1 | 3/2005 | Kobylevsky et al. | |
| 2005/0069103 A1 | 3/2005 | DiVenuta et al. | |
| 2005/0080651 A1 | 4/2005 | Morrison et al. | |
| 2005/0209879 A1 | 9/2005 | Chalmers | |
| 2006/0149587 A1 | 7/2006 | Hill, Sr. et al. | |
| 2006/0247968 A1 | 11/2006 | Kadry | |
| 2006/0271398 A1 | 11/2006 | Belcastro | |
| 2007/0119930 A1 | 5/2007 | Jordan | |
| 2007/0214009 A1 | 9/2007 | Epstein et al. | |
| 2007/0219822 A1 | 9/2007 | Godwin et al. | |
| 2007/0250341 A1 | 10/2007 | Howe et al. | |
| 2008/0208628 A1 | 8/2008 | Kobylevsky et al. | |
| 2008/0208986 A1 | 8/2008 | Kobylevsky et al. | |
| 2008/0228519 A1 | 9/2008 | Leon | |
| 2009/0006141 A1 | 1/2009 | Karr | |
| 2010/0215155 A1 * | 8/2010 | OHanlon | 379/88.04 |
| 2011/0082705 A1 | 4/2011 | Kobylevsky et al. | |
| 2012/0330678 A1 | 12/2012 | Kobylevsky et al. | |

OTHER PUBLICATIONS

Office Action dated Dec. 8, 2009, from pending U.S. Appl. No. 09/858,877 (14 pages).

Office Action dated Jan. 14, 2010, received from the Canadian Patent Office, in connection with pending Canadian Application No. 2,475,959 (4 pages).

Office Action dated Feb. 18, 2011, received from the Canadian Patent Office in connection with Canadian Patent Application No. 2,475,959 (4 pages).

Office Action dated May 25, 2010, from pending U.S. Appl. No. 10/941,307 (12 pages).

Interview Summary dated May 25, 2010, from pending U.S. Appl. No. 09/858,877 (3 pages).

Office Action dated Jun. 8, 2010, from pending U.S. Appl. No. 11/711,496 (17 pages).

Cain, et al., "Health e-People: The Online Consumer Experience," Aug. 2000, Institute for the Future (73 pages).

Notice of Allowance dated Aug. 23, 2010, from pending U.S. Appl. No. 09/858,877 (7 pages).

Interview Summary dated Sep. 13, 2010, from pending U.S. Appl. No. 10/941,307 (6 pages).

Office Action dated Oct. 1, 2010, from pending U.S. Appl. No. 12/058,931 (13 pages).

"Microlog Expands Services for the Retail Pharmacy Market," PR Newswire, Aug. 22, 1997 (1 page).

"Dial-a-Script Saves Bi-Mart Money and Time," Drug Store News, vol. 22, Issue 12, Aug. 28, 2000 (1 page).

Popolillo, "Shopko, ateb Team Up for Pharmacy Convenience," Drug Store News, vol. 21, Issue 4, Mar. 1, 1999 (2 pages).

Frederick, "Wal-Mart's New Combo Format Drawing Pharmacy, Food Customers," Drug Store News, Nov. 23, 1998 (3 pages).

Frederick, "American Drug Stores," Drug Store News, vol. 18, Issue 7, Apr. 29, 1996 (3 pages).

"Shopko Sees Health Cam as Core Part of Operation," Chain Drug Review, No. 14, vol. 21, Aug. 30, 1999 (2 pages).

"CVS Uses Technology to Change the Face of its Pharmacy Business; RX: Marketplace," Chain Drug Review, No. 21, vol. 19, Dec. 15, 1997 (2 pages).

"Longs Drugs Rolling Out Novadigm to 380+ Remote Stores to Deploy and Manage Its Core Business Applications," PR Newswire, Aug. 23, 1999 (2 pages).

"Microlog Completes Systems Integration Work for Eckerd Pharmacy Chain Equities," PR Newswire, Jul. 21, 1999 (2 pages).

"Getting the Message; How Protodigm and Pharmacia & Upjohn Use Communications Systems," Pharmaceutical Times, Jul. 31, 1998 (1 page).

(56) References Cited

OTHER PUBLICATIONS

"Synectics Inks IRV Pact With Wal-Mart annotated Title-Wal-Mart Pharmacies Will Use an Interactive Voice Response System Developed by Synectics, Inc. (Raleigh, NC) to Give Customers and Doctors 24-Hour Access to the Pharamacy," Drug Store News, vol. 19, Issue 17, Oct. 20, 1997 (3 pages).
"Touch Tone Prescriptions: Telephony and Beyond," Pharmacy Times, vol. 63, 1997 (2 pages).
Thompson, "Expanding Role of Certified Pharmacy Technicians in Outpatient Pharmacy Automation Management," ASHP Midyear Clinical Meeting, vol. 32, Dec. 1997 (1 page).
"ATEB Installs Pharmacy Line Voice Response System at ShopKo Stores," Drug Store News, vol. 20, Issue 13, Aug. 24, 1998 (1 page).
Pastore, "Voice System Reins in Agency's Costs," Computerworld, Sep. 17, 1990 (2 pages).
SOAP Version 1.2 Part 1: Messaging Framework (Second Edition), http://www.w3.org/TR/soap12-part1/, Apr. 27, 2007 (47 pages).
Chopra, et al., "Voice-Activated Networked Workstation for a Physically Disabled Physician," Proceedings of the 16th Annual Int'l Conf. of the IEEE, Nov. 3-6, 1994.
Refill Telemanger, Logicom, 1996.
PCT International Search Report mailed Feb. 23, 2007, in connection with International Publication No. WO 2006/031983 A2 (3 pages).
PCT Written Opinion mailed Feb. 23, 2007, in connection with International Publication No. WO 2006/031983 A2 (3 pages).
PCT International Preliminary Examination Report mailed Mar. 20, 2007, in connection with International Publication No. WO 2006/031983 A2 (4 pages).
PCT International Search Report mailed Jul. 11, 2003, in connection with International Publication No. WO 03/069597 A1 (4 pages).
Press Release entitled "Harland Financial Solutions and Maxxar Corporation Establish Alliance to Bring One-to-One Marketing to Telephone Banking," dated Jan. 9, 2001 by Harland Financial Solutions (2 pages).
Brochure entitled "Customer Capture—CTG Implements a Customer-Specific Marketing Program for a Major Retailer," dated Sep. 2003 by CTG (2 pages).
Brochure entitled "TeleVoice—The Next Generation of Voice Response for Mortgage Servicing Call Centers," dated Mar. 2006 by Fidelity National Information Services (6 pages).
"Case Studies—Client: State of Michigan Office of Retirement Services," website printout from http:/www.covansys.com/clients/case_michigan.htm, dated Apr. 13, 2006 (4 pages).
Notice of Allowance dated Aug. 16, 2002, from U.S. Patent No. 6,493,427 (5 pages).
Interview Summary dated May 31, 2002, from U.S. Patent No. 6,493,427 (3 pages).
Office Action dated Apr. 12, 2002, from U.S. Patent No. 6,493,427 (9 pages).
Office Action dated Oct. 22, 2001, from U.S. Patent No. 6,493,427 (27 pages).
Advisory Action dated May 23, 2001, from U.S. Patent No. 6,493,427 (4 pages).
Office Action dated Jan. 31, 2001, from U.S. Patent No. 6,493,427 (15 pages).
Office Action dated May 22, 2000, from U.S. Patent No. 6,493,427 (19 pages).
Supplemental Notice of Allowability dated May 4, 2004, from U.S. Patent No. 6,744,862 (5 pages).
Notice of Allowance dated Jan. 13, 2004, from U.S. Patent No. 6,744,862 (6 pages).
Office Action dated Oct. 3, 2003, from U.S. Patent No. 6,744,862 (10 pages).
Response to Rule 312 Communication dated Aug. 25, 2004, from U.S. Patent No. 6,804,654 (3 pages).
Notice of Allowance dated Jun. 28, 2004, from U.S. Patent No. 6,804,654 (4 pages).
Inteview Summary dated Mar. 10, 2004, from U.S. Patent No. 6,804,654 (4 pages).
Office Action dated Dec. 18, 2003, from U.S. Patent No. 6,804,654 (11 pages).
Office Action dated Jun. 16, 2003, from U.S. Patent No. 6,804,654 (10 pages).
Office Action dated Oct. 14, 2008, from pending U.S. Appl. No. 09/858,877 (6 pages).
Office Action dated Jan. 15, 2008, from pending U.S. Appl. No. 09/858,877 (22 pages).
Office Action dated Jul. 19, 2007, from pending U.S. Appl. No. 09/858,877 (23 pages).
Office Action dated Dec. 12, 2006, from pending U.S. Appl. No. 09/858,877 (21 pages).
Advisory Action dated Oct. 10, 2006, from pending U.S. Appl. No. 09/858,877 (4 pages).
Office Action dated May 31, 2006, from pending U.S. Appl. No. 09/858,877 (23 pages).
Office Action dated Aug. 11, 2005, from pending U.S. Appl. No. 09/858,877 (22 pages).
Office Action dated Jun. 11, 2008, from pending U.S. Appl. No. 10/672,556 (14 pages).
Office Action dated Feb. 5, 2008, from pending U.S. Appl. No. 10/672,556 (14 pages).
International Search Report of the International Searching Authority mailed May 5, 2009, issued in connection with International Patent Appln. No. PCT/US09/37948 (3 pages).
Written Opinion of the International Searching Authority mailed May 5, 2009, issued in connection with International Patent Appln. No. PCT/US09/37948 (5 pages).
Office Action dated Apr. 15, 2009, from pending U.S. Appl. No. 09/858,877 (10 pages).
Office Action dated Nov. 5, 2008, from issued U.S. Patent No. 7,558,380 (12 pages).
Notice of Allowance dated Mar. 6, 2009, from issued U.S. Patent No. 7,558,380 (9 pages).
Press release dated 1999 and entitled "Hannaford Bros. Installs Refill Telemanger IVR System," (1 page).
Printout dated Oct. 31, 2001, entitled: "Refill Telemanager—The Affordable Automation Tool for Prescription Refills," (http://www.telemanager.com/RTInfo/RTInfo.html) (3 pages).
"2008 Buyers Guide Quick Reference Table," ComputerTalk Magazine, Mar./Apr. 2008, p. 85 (1 page).
"TeleManager Technologies, Inc.—The New Prescription for All Your Telecommunication Needs," ComputerTalk, (2008) p. 42 (1 page).
Brochure, "Refill Telemanager In-Store IVR System," (2007) (1 page).
Brochure, "Telemanager On-Demand IVR System," (2007) (1 page).
Brochure, "New Community Pharmacy Automated Refill Telephone System," (1992) (2 pages).
"Quick Reference Guide," (1992) (1 page).
Brochure, "Refill Telemanager—The Affordable Automation Tool for Prescription Refills," (1990) (2 pages).
"Refill Telemanager User's Guide," (2009) (58 pages).
"Refill Telemanager User's Guide," (1997) (37 pages).
Brochure, "Refill Telemanager Service," (1998) (2 pages).
Brochure, "Refill Telemanager Service—Frequently Asked Questions," (1998) (1 page).
Brochure, "Finally! Unique, New Technology Designed to Increase Your Sales, Customer Service, and Employee Productivity at a Price Every Store Can Afford!," (1998) (1 page).
Brochure, "Refill Telemanager Service—Information Retrieval Guide" (1998) (2 pages).
Brochure, "Refill Telemanager Service" (1998) (2 pages).
Office Action dated Jan. 5, 2011, from pending U.S. Appl. No. 11/711,496 (18 pages).
Office Action dated Apr. 5, 2011, from pending U.S. Appl. No. 10/941,307 (14 pages).
Notice of Allowance dated Dec. 19, 2011, from pending U.S. Appl. No. 10/941,307(12 pages).
Dialog OuickSearch, http://dialogquicksearch.dialog.com/USPTO/search/doSearch.action, provided by USPTO with Notice of Allowance from pending U.S. Appl. No. 10/941,307 mailed on Dec. 19, 2011 (5 pages).

(56) References Cited

OTHER PUBLICATIONS

Office Action dated Jun. 27, 2011, from pending U.S. Appl. No. 12/058,931 (13 pages).
Interview Summary dated Aug. 22, 2011, from pending U.S. Appl. No. 12/058,931 (4 pages).
Interview Summary dated Aug. 22, 2011, from pending U.S. Appl. No. 11/711,496 (4 pages).
Office Action dated Oct. 3, 2011, from pending U.S. Appl. No. 12/947,355 (10 pages).
Office Action dated Jul. 24, 2012, from pending U.S. Appl. No. 12/947,355 (12 pages).
Office Action dated Feb. 13, 2013, from pending U.S. Appl. No. 13/540,780 (14 pages).
Office Action dated May 14, 2013, from pending U.S. Appl. No. 11/711,496 (10 pages).
Office Action dated May 17, 2013, issued in connection with Canadian Patent Application No. 2,580,258 (2 pages).
Office Action dated Dec. 3, 2013, from pending U.S. Appl. No. 13/540,780 (10 pages).
Notice of Allowance dated Jan. 15, 2014, from pending U.S. Appl. No. 11/711,496 (10 pages).
Office Action dated Mar. 18, 2014, from pending U.S. Appl. No. 12/058,931 (18 pages).
Notice of Allowability dated Apr. 10, 2014, from pending U.S. Appl. No. 11/711,496 (7 pages).

* cited by examiner

SYSTEM AND METHOD FOR PROVIDING LOCAL INTERACTIVE VOICE RESPONSE SERVICES

BACKGROUND OF THE INVENTION

1. Field of the Invention

The present invention relates to telecommunications systems/methods. More specifically, the present invention relates to a system and method for providing local interactive voice response services.

2. Related Art

Interactive voice response (IVR) systems are known in the art. Such systems provide telephone callers with the ability to obtain information, and/or conduct activities (e.g., ordering a product/service, refilling a prescription, etc.) using synthesized and/or pre-recorded speech generated by a computer system. Such a computer system is often connected to the public telephone switched network (PTSN) to receive telephone calls from callers, and includes associated telephony hardware for processing telephone calls. Also, such systems can handle telephone calls which are generated using Voice-over-Internet Protocol (VoIP), e.g., telephone calls placed to the IVR system over an Internet Protocol (IP) network.

One drawback of existing IVR systems is that telephone calls are often handled by a central IVR server having PTSN and VoIP connections directly thereto. Such an arrangement represents an expense for a business, in that the business must purchase telephone equipment to handle inbound calls. In the case of a large business which handles multiple telephone calls, this can represent a significant expense. Moreover, voice traffic is bandwidth intensive, thereby requiring a business operating a central IVR system to provide sufficient network capacity to handle the traffic. Still further, many central IVR systems do not allow for the provisioning of IVR services locally, using a local computer that receives telephone calls and generates IVR prompts locally under the command of a central server, such that reduced bandwith is required between the central server and the local computer.

SUMMARY OF THE INVENTION

The present invention relates to a system and method for providing local interactive voice response (IVR) services. A local computer system having associated telephony equipment and installed at a local facility (e.g., a retail store of a chain, etc.) receives telephone calls to the local facility. The local computer system generates IVR prompts locally, and is in communication with a central IVR server which controls the generation of IVR prompts by the local computer system. Bandwidth requirements between the local computer system and the central IVR server are reduced because no voice traffic is communicated between the central IVR server and the local computer system. Rather, the central IVR server provides the local computer system with one or more pages of information (e.g., Voice Extensible Markup Language (VXML)) which are transmitted to the local computer system and require less bandwidth than voice traffic. The pages of information are parsed by the local computer system using a browser executing thereat, to locally generate IVR prompts for the caller.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for providing local interactive voice response services, described in detail below in connection with FIGS. 1-4.

Figure 1:
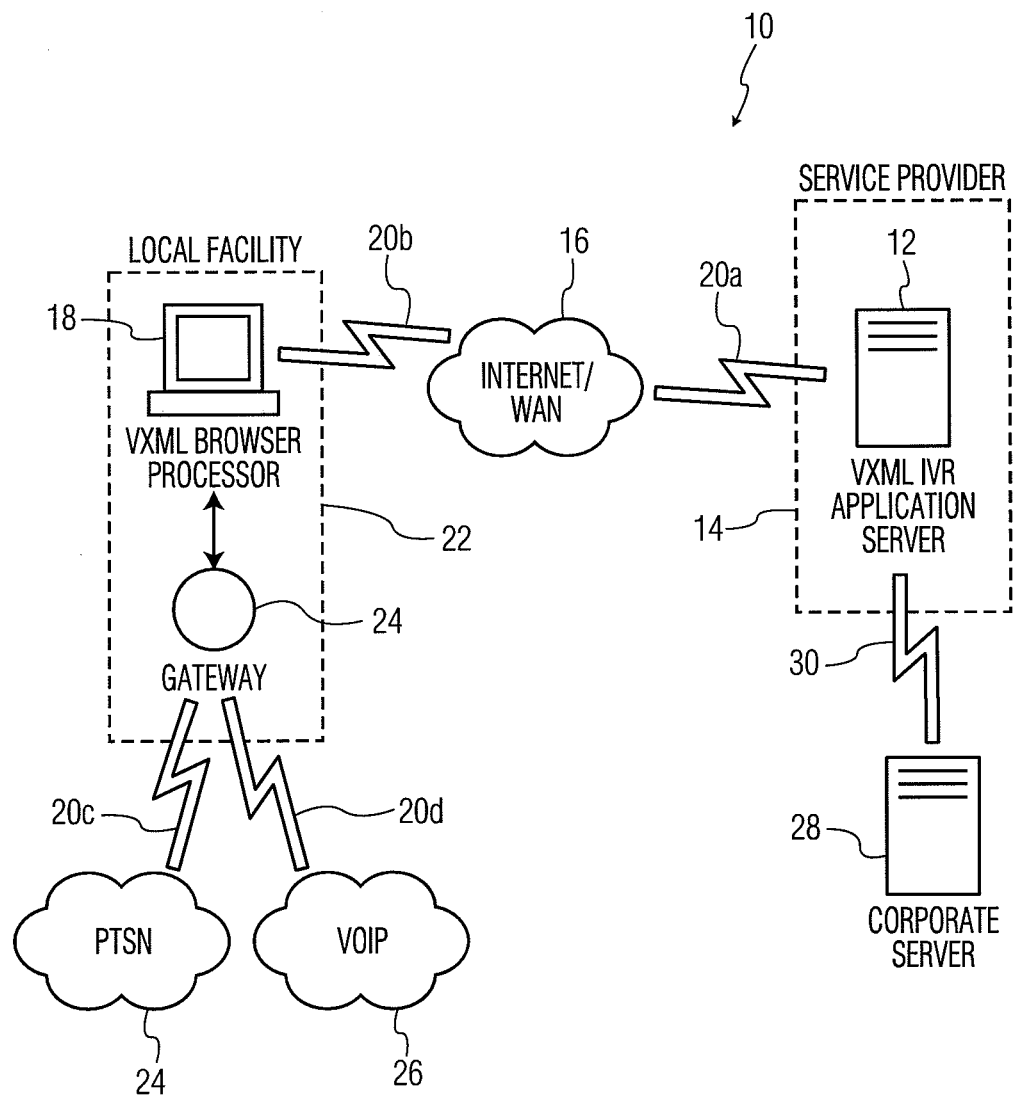
FIG. 1 is a diagram showing hardware components according to the present invention for providing local interactive voice response services for a business.

FIG. 1 is a diagram showing hardware components according to the present invention, indicated generally at 10, for providing local interactive voice response services. A central IVR application server 12 is provided at a service provider's location 14, and is in communication with a local computer (processor) 18 located at a local facility 22 using the Internet 16 (or, a dedicated Wide Area Network (WAN)) and associated communications links 20a-20b. The local facility 22 could be any desired facility, such as a local store of a business, a retail location of a chain, a local movie theater of a chain of movie theaters, a local pharmacy of a chain of pharmacies, or even a single business location (e.g., an independent retail location not affiliated with a chain). Moreover, the local facility 22 could be a professional office (e.g., doctor or lawyer), a library, a repair shop, etc. Indeed the local facility 22 could be any location where the ability to locally handle telephone calls using IVR is desirable.

The local facility 22 includes a gateway 24 for handling telephone calls to the local facility 22 which could originate from the Public Telephone Switched Network (PTSN) 24, or through a Voice-over-Internet Protocol (VoIP) connection 26. The gateway 24 could comprise telephony equipment which executes suitable telephony protocols, such as the Internet Protocol (IP) based Session Initiation Protocol (SIP) or any other suitable equivalent. In order to locally generate an IVR session for a caller, the local computer 18 requests a page from the application server 12, such as a Voice Extensible Markup Language (VXML) page. Once received, the page is executed by a browser executing on the local computer 18, such as a VXML browser. The page contains textual information which instructs the local computer 18 as to specific IVR prompts/menus to generate during a call. More than one page could be transmitted to the local computer 18. Advantageously, this allows for the remote control of the local computer 18 by the server 12, with reduced bandwidth requirements between the local computer 18 and the server 12, since no voice traffic is exchanged between the server 12 and the local computer 18.

It is noted that the server 12 need not be located at a service provider's location. Indeed, the server 12 could be located at any desired location remote from the local facility 22, such as at a chain headquarters, corporate office, central computer facility, etc., without departing from the spirit or scope of the present invention. Moreover, the server 12 could be in communication with a corporate server 28 via communications link 30, so that information generated during a locally-generated IVR session can be processed by the corporate server 28. For example, the corporate server 28 could be a server which processes orders for goods/service purchased during a locally-generated IVR session, for fulfillment of the orders. Moreover, the corporate server 28 could be part of a central data processing system of an organization, which provides the information to the IVR application server 12 that is subsequently relayed to a caller during the locally-generated IVR session, in response to a request for information generated by a caller. For example, if the local facility 22 is a local theater of a chain of movie theaters, and the corporate server 28 is an information server operated by the chain (containing information about movies currently being played by various facilities of the chain), the corporate server 28 could provide movie information to the application server 12 in response to a request for information about movies currently being played by the local theater. As can be appreciated, the applications of the system of the present invention are virtually limitless.

Figure 2:
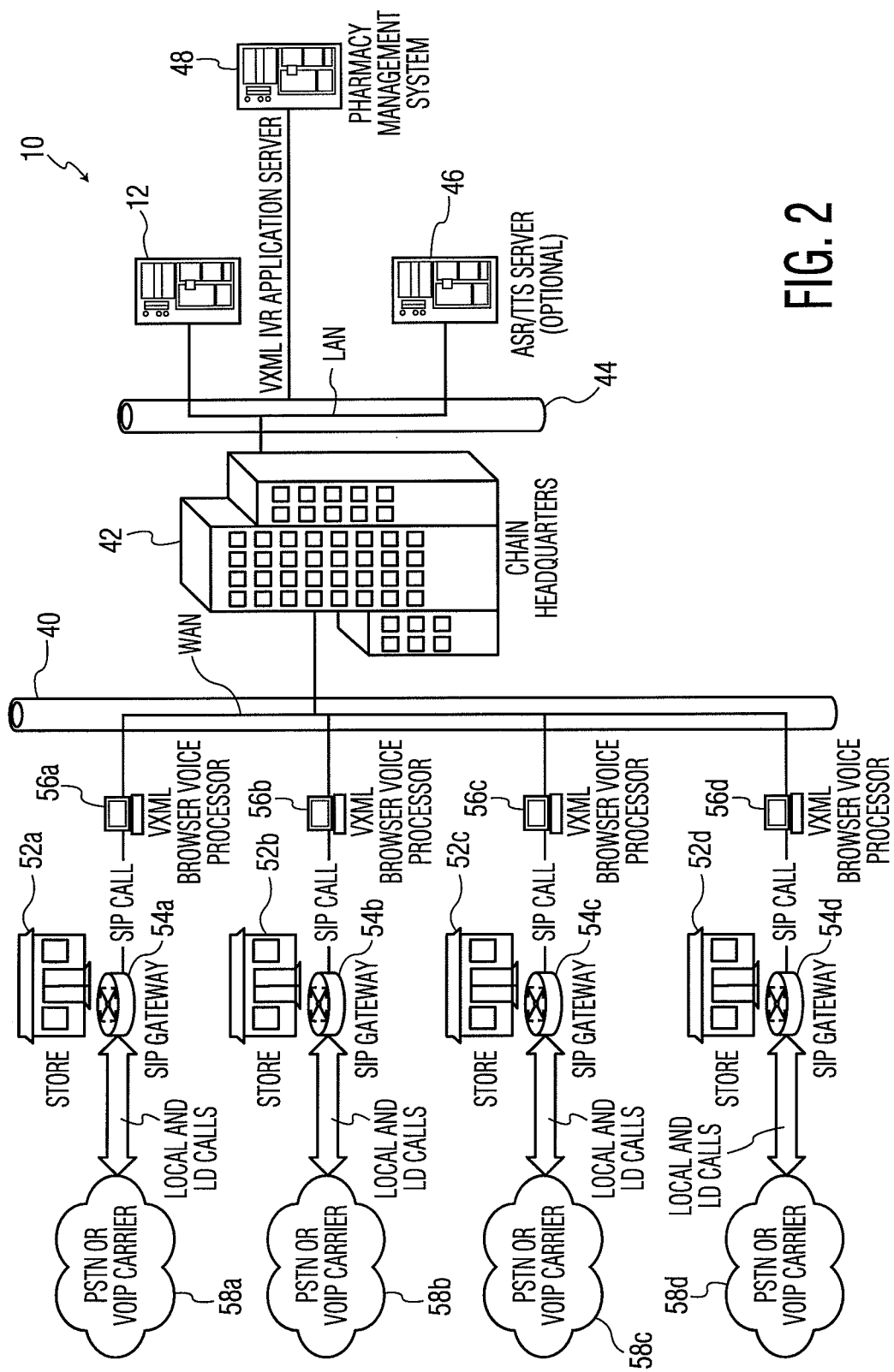
FIG. 2 is a diagram showing hardware components according to the present invention for providing local interactive voice response services for pharmacy chain.

FIG. 2 is a diagram showing hardware components according to the present invention, indicated generally at 10, for providing local interactive voice response services for a pharmacy chain. Specifically, locally-generated interactive voice response is provided at a pharmacy using Voice Extensible Markup Language (VXML) technology. A plurality of pharmacies (stores) 52*a*-52*d* receive local and long-distance prescription refill telephone calls via PSTN or VoIP telephone connections between callers and the pharmacies 52*a*-52*d*, using telephony gateways 54*a*-54*d* at the pharmacies 52*a*-52*d*. The gateways 54*a*-54*d* execute suitable telephony protocols, such as the Internet Protocol (IP) based Session Initiation Protocol (SIP) or any other suitable equivalent. Also provided at the pharmacies 52*a*-52*d* are VXML browser voice processors 56*a*-56*d*, which are computer systems executing VXML browser scripts to provide interactive voice response (IVR) sessions for callers who wish to telephonically request prescription refills.

Each of the VXML processors 56*a*-56*d* are in communication with a headquarters 42 of a pharmacy chain using a wide area-network (WAN) 40. The WAN 40 could include an entirely private digital communications network interconnecting each of the pharmacies 52*a*-52*d* and the headquarters 42, as well as the Internet (e.g., using Virtual Private Network (VPN) connections). The headquarters 42 is in communication with the VXML IVR application server 12 (which, together with the VXML processors 56*a*-56*d*, execute processing steps (discussed below) for locally generating prompts using VXML technology), a pharmacy management system 48 (for processing refill requests once they have been received), and, optionally, a server 46 which provides automatic speech recognition (ASR) and/or text-to-speech (TTS) services for providing speech recognition and synthesized speech during a telephone call, using a local area network (LAN) 44. The server 46 could communicate with the VXML processors 56*a*-56*d* using the Media Resource Control Protocol (MRCP) to allow for the provisioning of speech recognition services by the server 46 during an IVR session handled by the processors 56*a*-56*d*. Thus, for example, if it is desired to allow caller to speak his or her prescription refill number (rather than using the keys of a telephone keypad) during an IVR session, the server 46 could process spoken refill information during the IVR session. In such circumstances, VXML processors 56*a*-56*d* receive spoken information during a call, digitize and process same using the MRCP protocol, and transmit the processed spoken information to the server 46. The server 46 processes the transmitted spoken information into textual information, and transmits the textual information back to the VMXL processors 56*a*-56*d*. This information can then be included in an HTTP request to be sent to the server 12, as discussed below in connection with FIG. 3.

As discussed below, the VXML processors 56*a*-56*d* and the VXML IVR application server 12 allow for processing telephonic prescription refill requests using VXML technology. Importantly, this arrangement allows for the generation of IVR prompts locally, i.e., at each pharmacy 52*a*-52*d*, under control of the VXML IVR application server 12, thereby eliminating the need to generate IVR voice prompts at a single, central server and to transmit such prompts to each pharmacy 52*a*-52*d* for subsequent transmission to callers. Advantageously, this results in reduced bandwidth requirements between each pharmacy 52*a*-52*d* and the chain headquarters 42, as only VXML page information must be exchanged between the VXML processors 52*a*-52*d* and the VXML IVR application server 12. As a result, each pharmacy 52*a*-52*d* does not need to invest in expensive, high-bandwidth network connections with the chain headquarters 40 which would ordinarily be required if IVR voice prompts were not generated locally at the pharmacies 52*a*-52*d*.

Figure 3:
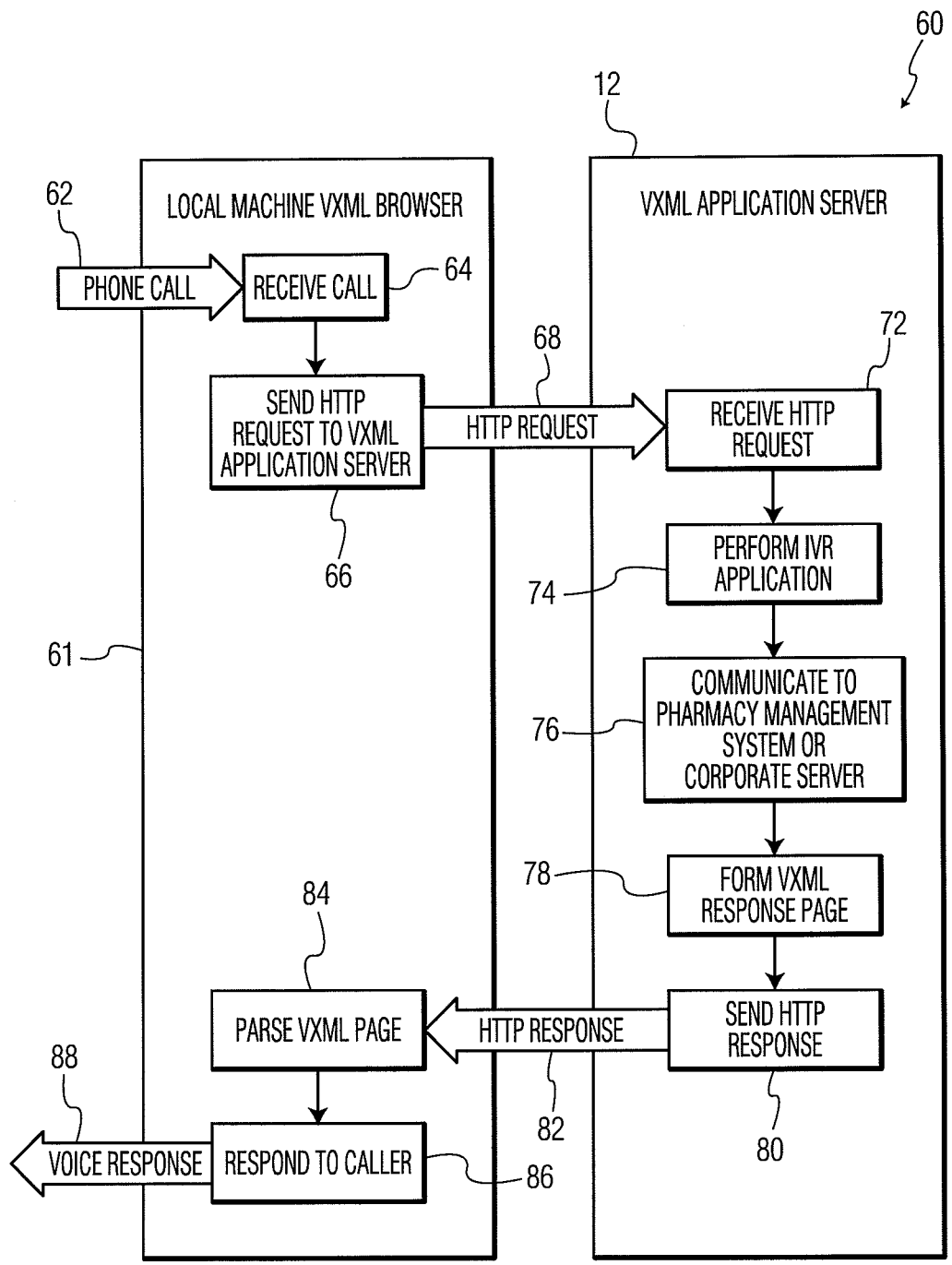
FIG. 3 is a flowchart showing processing steps according to the present invention for providing local interactive voice response services for a business.

FIG. 3 is a flowchart showing processing steps according to the present invention, indicated generally at 60, for locally generating IVR prompts in response to telephone calls received at a local facility (e.g., at the local facility 22 of FIG. 1, or the pharmacies 52*a*-52*d* of FIG. 2. As shown, the steps depicted in FIG. 17 are executed by a local computer VXML browser 61 (i.e., VXML browser applications executing on the VXML voice processor 18 of FIG. 1, or the processors 56*a*-56*d* of FIG. 16), and the VXML application server 12 shown in FIGS. 1-2. In step 64, a phone call 62 is received by the VXML browser 61. The browser 61 parses a VXML page which has been transmitted to the browser 61 by the server 12, supplied with the browser 12, or installed in the local processor of the local facility, so that the browser can locally generate audible prompts. Thus, for example, when the call 62 is received, the browser 61 could parse a VXML page which includes instructions for generating an audible IVR menu of options for the caller. In such circumstances, voice synthesis is carried out by the browser 61, under the direction of the VXML page.

In step 66, a Hypertext Transfer Protocol (HTTP) request 68 is generated by the browser in response to information provided by a caller. For example, after the VXML browser 61 plays a menu of options, the caller can select an option to request information (e.g., information about movies played by a local theater), order goods/services, etc., as well as to telephonically convey a prescription refill request and can then supply information for the prescription refill request (e.g., by specifying (using the keys of a telephone) a prescription refill number and a desired pick-up time). The requested information, order, etc. is included in the HTTP request 68 by the browser 66.

In step 72, the HTTP request is received by the application server 12. Then, in step 74, and IVR application is executed on the server 12. In step 76, the information supplied by the caller and stored in the HTTP request 68 is communicated to a pharmacy management system (e.g., the pharmacy management system 48 of FIG. 16), or to a corporate server (e.g., the corporate server 28) for subsequent processing. For example, a prescription refill number and a desired refill time could be communicated by the pharmacy management system 48 to a specific pharmacy near the caller so that the prescription can be refilled. Also, in the case of the corporate server 28 of FIG. 1, a request for information, an order for a product/service, etc., can be processed by the corporate server 28 to provide responsive information, fulfill an order, etc. In step 78, a VXML response page is generated using the IVR application executing on the server 12. Such a response page could be a sequence of VXML instructions for instructing the VXML browser 61 to audibly convey information to the caller, such as a message indicating that a refill request has been received and will be processed, information in response the caller's request for information, a message confirming that an order has been received and will be processed, etc. Then, in step 80, the responsive VXML page is sent to the browser 61 as an HTTP response 82. Finally, in step 84, the responsive VXML page is parsed, and in step 86, a response is audibly conveyed to the caller as a voice response 88, under control of instructions included in the responsive VXML page.

Figure 4:
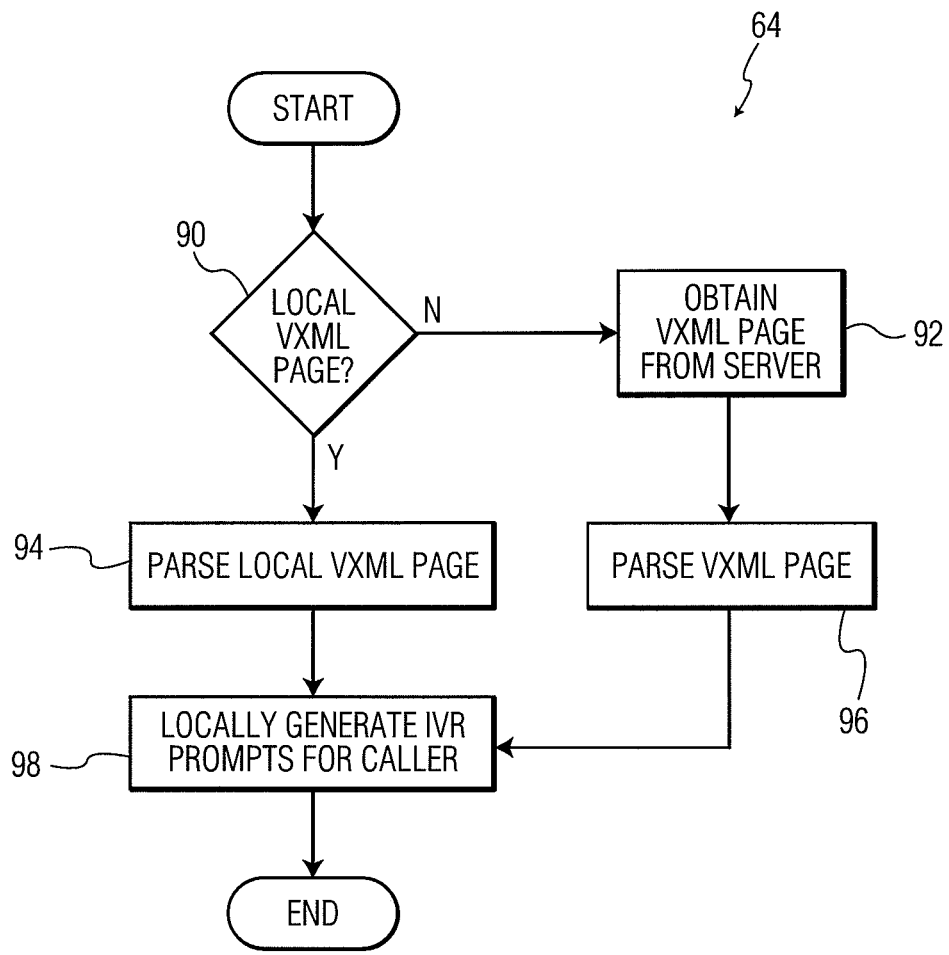
FIG. 4 is a flowchart showing processing steps according to the present invention for generating IVR prompts when a telephone call is received by a local computer system.

FIG. 4 is a flowchart showing processing step 64 of FIG. 3 in greater detail. Beginning in step 90, when a telephone call is received by the VXML browser 61 of FIG. 3, a determination is made as to whether a local VXML page exists on the local computer system on which the VXML browser 61 is executing. As discussed earlier, the local computer system could have a VXML page pre-installed, or previously transmitted thereto, which controls local generation of IVR prompts. For example, a page could exist on the local computer system with instructions as to how to generate audible menu of options for a caller whenever a telephone call is received. If a positive determination is made, step 94 occurs, wherein the VXML browser 61 parses the local VXML page. Then, in step 98, the VXML browser locally generates IVR prompts (e.g., a menu of options) for the caller, under the control of the local VXML page. Otherwise, if a negative determination is made in step 90, step 92 occurs, wherein the VMXL browser 61 obtains a VXML page from the VXML application server 12. Then, in step 96, the VXML page obtained from the VXML application server 12 is parsed by the VXML browser 61, and step 98, discussed above, is executed so that IVR prompts are generated locally using the VXML page obtained from the server 12. As can be appreciated, the logic shown in FIG. 4 thus allows the present invention to locally generate IVR prompts using a VXML page pre-installed or previously transmitted to the local computer system, or using a VXML page obtained from a remote server.

Having thus described the invention in detail, it is to be understood that the foregoing description is not intended to limit the spirit or scope thereof. What is desired to be protected is set forth in the following claims.

What is claimed is:

1. A system for locally-generated interactive voice response, comprising:
a gateway at a local facility for receiving a telephone call from a caller;
a processor at the facility for locally generating voice prompts for prompting the caller to provide information, and for generating a request relating to the information provided by the caller;
a first communications link between the processor and a first server at a service provider remote from the local facility for transmitting the request to the first server; and
a second communications link between the first server and a second server remote from the first server;
wherein the first server receives the request over the first communications link, processes the request using an interactive voice response (IVR) application executing on the first server to generate a response, communicates information stored in the request to the second server over the second communications link, said information generated during an IVR session generated by the processor at the facility, and transmits the response to the local facility, the processor receiving the response and conveying the response to the caller using the gateway, and
wherein the processor at the facility receives spoken information from the caller during the telephone call, digitizes the spoken information, and transmits the digitized spoken information to a speech recognition server remote from the processor, local facility, and the speech recognition server processes the digitized spoken information into textual information and transmits the textual information to the processor for subsequent use of the textual information by the processor.

2. The system of claim 1, further comprising a page transmitted from the first server to the processor over the first communications link for controlling local generation of voice prompts by the processor.

3. The system of claim 2, wherein the page comprises a Voice Extensible Markup Language (VXML) page transmitted to a browser executing on the processor by the first server.

4. The system of claim 3, wherein the browser parses the VXML page to generate the voice prompts.

5. The system of claim 1, wherein the first server generates a responsive VXML page and transmits the responsive VXML page to the processor.

6. The system of claim 5, wherein the responsive VXML page is parsed by a VXML browser executing on the processor to generate a responsive voice message for the caller.

7. The system of claim 1, wherein the automatic speech recognition server provides text-to-speech services for generating synthesized speech from text during the telephone call.

8. The system of claim 1, wherein the information provided by the caller comprises prescription refill information, and the request comprises a prescription refill request.

9. The system of claim 8, wherein the second server comprises a pharmacy management system and the prescription refill request is transmitted by the first server to the pharmacy management system for processing and subsequent refilling of a prescription by a pharmacy.

10. The system of claim 1, wherein the information provided by the caller comprises order information, and the request comprises an order for a good or a service.

11. A method for providing local interactive voice response, comprising the steps of:
receiving a telephone call at a local facility;
receiving information from a caller at a local computer at the local facility;
generating a request at the local computer relating to the information received from the caller;
transmitting the request to a first server remote from the local computer and at a service provider location remote from the local facility, the first server in communication with the local computer over a data network;
processing the request using an interactive voice response (IVR) application executing on the first server;
generating a responsive page having a response at the first server;
communicating information stored in the request to a second server remote from the first server over the data network, said information generated during an IVR session generated by the local computer;
transmitting the responsive page from the first server to the local computer using the data network;
parsing the responsive page using a browser at the local computer to locally generate an voice prompt in response to the request;
receiving spoken information from the caller during the telephone call at the processor;

digitizing the spoken information using the processor;
transmitting the digitized spoken information to a speech recognition server remote from the local facility;
processing the digitized spoken information into textual information at the speech recognition server; and
transmitting the textual information to the processor for subsequent use of the textual information by the processor.

12. The method of claim 11, wherein the step of transmitting the page further comprising transmitting a VXML page to the browser.

13. The method of claim 12, further comprising generating the voice prompts by parsing the VXML page using the browser.

14. The method of claim 11, wherein the step of communicating the response to the second server comprises transmitting the request to a computer system in communication with the first server and processing the request at the computer system.

15. The method of claim 14, further comprising obtaining responsive information from the computer system by the first server.

16. The method of claim 15, wherein the step of generating the responsive page comprises including the responsive information in the responsive page.

17. The method of claim 11, wherein the step of receiving information the caller comprises receiving a prescription refill request.

18. The method of claim 11, wherein the step of receiving information from the caller comprises receiving an order for a good or a service.

19. The system of claim 1 wherein the second server processes orders for goods/services for fulfillment.

20. The system of claim 1 wherein the second server comprises a central data processing system for providing information to the first server.

21. The system of claim 20 the information provided by the central data processing system is communicated from the first server to the local facility over the first communications link and to a caller.

* * * * *